UNITED STATES PATENT OFFICE 2,593,428

USE OF DIPHENYLOL PROPANE IN ESTERIFICATION AND ESTER PRODUCTS

Wilbur F. Fischer, Roselle Park, Frederick Knoth, Jr., Sayreville, and Raymond G. Newberg, Roselle Park, N. J., assignors to Standard Oil Development Company, a corporation of Delaware No Drawing. Application June 21, 1950, Serial No. 169,540

16 Claims. (Cl. 260—475)

This invention relates to improvements in the methods of esterifying synthetic branched chain alcohols. More particularly, this invention relates to improved methods of esterifying synthetic branched chain alcohols of the $C_7$ to $C_9$ range by incorporating in the esterification reaction mixture small amounts of particular bisphenols and especially diphenylol propane.

The ever expanding use of plastic materials such as vinyl chloride polymers or copolymers, polyvinyl acetate, cellulose esters, acrylate and methacrylate resins, rubbers such as the emulsion copolymers of butadiene with styrene or acrylonitrile, or the copolymers of isobutylene with small amounts of a diolefin such as isoprene have created a large demand for suitable plasticizers. Branched chain alkyl organic acid esters and particularly alkyl phthalic acid esters and more particularly di-2-ethylhexyl phthalate, have been known to be satisfactory plasticizers for the aforementioned high molecular weight materials.

Synthetic branched chain Oxo alcohol products produced by the well-known Oxo process (see e. g. U. S. Patent 2,327,066 and U. S. Bureau of Mines Publication R1 4270, "Critical Review of Chemistry of the Oxo Synthetic, etc.," 1948) have also come into commercial use in the production of esters suitable for plasticizers, by reaction with both aliphatic and aromatic acids or anhydrides including such examples as phthalic acid, sebacic acid, oleic acid, stearic acid, lauric acid, maleic acid, adipic acid, and also phthalic and maleic acid anhydrides. Certain of the synthetic alcohols prepared by the oxonation and hydrogenation reaction are known to be especially suitable for the manufacture of ester plasticizers and particularly for use in clear plastics. These include alcohols of from $C_4$ to $C_{13}$ range such as the butyl alcohols, the octanols, and the nonanols. It has recently been learned that synthetic alcohols of the $C_8$ series and particularly those chosen from the iso-octyl type are among the best type of esterification alcohols to prepare plasticizers.

It is essential that these esters have good light and heat color stability and weathering characteristics. This latter criterion is difficult of realization however, probably because of impurities present in the synthetic alcohols such as polymerized and condensed higher molecular weight impurities as well as unreduced carbonyl compounds, unsaturated carbonylic compounds, and other non-alcoholic compounds.

The resulting organic acid esters, in many cases, are discolored during the course of the esterification reaction, or become discolored and are subject to deteriorative changes on standing.

In either case the esters can be quite unsuitable for use as plasticizers for clear plastic materials.

It has now been found that these difficulties in the esterification reaction between organic acids or their derivatives and especially phthalic acid, and the indicated synthetic alcohols are completely overcome by the addition of small amounts of specific bisphenol type stabilizers to the alcohol undergoing esterification in the esterification reaction mixture. The new stabilizers used in the present invention are bisphenol compounds having the formula

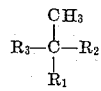

wherein $R_1$ is an alkyl radical of 1 to 4 carbon atoms, and $R_2$ and $R_3$ are hydroxyphenyl groups, preferably para-hydroxyphenyl. Such compounds can be obtained by condensing in a known manner two mols of a simple or a chlorine-substituted phenol with one mol of a ketone such as acetone, methyl ethyl ketone, methyl n-butyl ketone or methyl isobutyl ketone. The preferred stabilizer of this class is 2,2-di-(p-hydroxyphenyl)-propane, also referred to herein as diphenylol propane.

In addition, the bisphenols and particularly diphenylol propane has the unique series of properties of being stable under the esterification temperatures and catalysts if and when utilized, imparting no color to the resulting ester, and finally being carried through to the ester phase during the course of the reaction. This latter property also makes the diphenylol propane available for the stabilization of normally degradable resins when the ester is added to the latter as a plasticizing agent. Other commercially employed organic stabilizers, both phenolic and non-phenolic, do not yield such desirable results.

2,2-di-(p-hydroxyphenyl) propane, hereafter referred to simply as diphenylol propane, has been tried previously as an anti-oxidant for various hydrocarbon materials such as wax, natural rubber, and hydrocarbon polymers of other kinds. However, in all of the previous trials diphenylol propane proved to be generally inferior to other types of known anti-oxidants and for this reason its use as anti-oxidant never was commercially adopted by the art. In fact, the only major commercial outlet for diphenylol propane is understood to be in the field of chicken farming wherein it is used to control coccidiosis or protozean infestation of poultry.

Despite the previous failures, the surprising discovery has now been made that this bisphenol compound obtained by the condensation of phenol with acetone and having the formula:

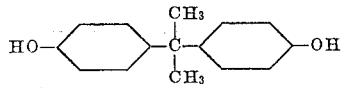

has a specific stabilizing effect on organic esters produced by the esterification reaction between organic acids or their derivatives and synthetic branched chain alcohols, especially those esters of $C_7$–$C_9$ alcohols with phthalic acid.

The alcohols for use in the indicated esterification reaction are preferably obtained by the "Oxo" process. The term "Oxo" process is well-understood in the art as referring to a process wherein an olefin feed is first reacted or "oxonated" with carbon monoxide and hydrogen at a temperature between 120 and 250° C., and under a pressure of about 150 to 400 atmospheres in the presence of a cobalt or similar catalyst, generally introduced in the form of a fatty acid salt, to form aldehydes in accordance with the following reaction:

$$C_nH_{2n} + CO + H_2 \rightarrow C_nH_{2n+1}CHO$$

The aldehydes so formed are then catalytically hydrogenated to form the desired alcohols as follows:

$$C_nH_{2n+1}CHO + H_2 \rightarrow C_nH_{2n+1}CH_2OH$$

The preferred hydrogenation catalysts are those of the sulfur sensitive nickel type though other known hydrogenation catalysts such as the sulfides of nickel, molybdenum and cobalt, with or without support on carbon, silica, etc., can also be used, especially where a rugged sulfur-insensitive catalyst is desired.

The over-all carbonylation or so-called Oxo reaction as outlined above, provides a particularly effective method for preparing valuable primary alcohols, particularly of the $C_4$ to $C_{12}$ range, which find large markets as intermediates for detergents and plasticizers. The $C_8$ and $C_9$ Oxo alcohol products are especially preferred for use in forming esters to be used as plasticizers in light-colored or colorless plastics and resins.

The most readily available olefinic feed stocks for the Oxo reaction as outlined above are selected hydrocarbon streams derived from petroleum refinery sources.

In connection with the Oxo reaction of olefin hydrocarbons, it has been found convenient to classify the various olefins into five fundamental types according to the character of carbon atoms linked by the olefinic bonds. These five types are as follows:

Type I  $CH_2=CHR$

Type II  $RCH=CHR$

Type III  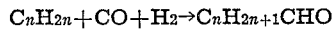

Type IV  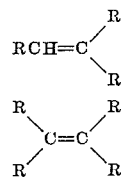

Type V  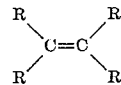

In the above formulas R represents a straight or a branched chain alkyl group, it being understood that where more than one symbol R appears in a formula, the several R symbols may represent the same alkyl group or different alkyl groups. Under this classification, for example, butene-1, 3-ethyl pentene-1, or 4,4-dimethyl pentene-1 are Type I olefins; butene-2, 4,4-dimethyl pentene-2, 2-methyl 5-ethyl hexene-3 are Type II olefins; 2,3,3-trimethyl butene-1 is a Type III olefin; 2,4-dimethyl pentene-2 is a Type IV olefin; tetramethyl ethylene is a Type V olefin; and so forth.

In the Oxo reactions, generally there is no invariable point of attack on the olefinic double bond such as one might predict from Markownikoff's rule, and thus in the case of Type I olefins of the formula $H_2C=CHCH_2R$ approximately equal amounts of both 1-substituted alcohols of the formula $CH_2OH.CH_2.CH_2.CH_2R$ and 2-substituted alcohols of the formula $CH_3.CH(CH_2OH).CH_2R$ are formed, with the 1-position being slightly favored. It is thus apparent that the Oxo process is inherently committed to the production of at least some branched-chain primary alcohols even when the starting material is a pure Type I straight-chain olefin. Type V olefins are usually incapable of oxonation. The oxonation feed may contain mono-olefins of any type and suitable olefinic feeds may be fractionated, for example, from cracked gases, from Fischer-Tropsch synthesis products or from a polymerized stream of $C_3$ to $C_5$ olefins.

The alcohols formed by oxonation of the olefinic materials described above are naturally quite complex in character and the exact composition of many of these products is not known. The $C_8$ Oxo alcohols obtained have thus been found to comprise a mixture of isomers.

Studies have been carried out to elucidate experimentally the structural composition of these iso-octyl alcohol isomers. The combined techniques of cracking the stearic acid ester, analyzing the resulting olefins for type by infra-red, hydrogenating, and analyzing the resulting paraffins for individual components have been employed. Several conclusions can be drawn:

1. The isomers present comprise predominantly those having five and six carbon atoms in the longest straight chain.

2. To the extent of at least 85%, and probably 95%, or more, there are no alkyl groups in the 2-position.

3. Of the possible 5% having one alkyl group in the 2-position, not more than about 1% based on the total alcohol, could be 2-ethylhexanol.

4. Not more than 10% (perhaps none) have 2-alkyl groups in the 2-position.

5. Of the eleven possible isomers qualifying under (3) above, two cannot be formed through oxonation and three are highly improbable on the basis of available compositional data on $C_7$ polypropylene. The number of likely principal isomers is thus reduced to five.

The high Type I assay and the boiling range of the olefins derived from iso-octyl alcohol, together with a priori exclusion of 3,3-dialkylated alcohols as products of oxonation, limit the number of possible major constituents of iso-octyl alcohol to nine isomers. On the basis of the best available data, only five of these alcohols could be formed in substantial amounts, the first three predominating.

| Alcohol | Major Constituents of Typical Iso-Octyl Alcohol | |
|---|---|---|
| | B. P., ° C., of Alcohol | Per Cent of Total |
| 4,5-Dimethyl hexanol | | 26 |
| 3,5-Dimethyl hexanol | 176 | 30 |
| 3,4-Dimethyl hexanol | | 18 |
| 3 and/or 5-methyl heptanol | 185.8–186.5 | 17 |
| Miscellaneous and unidentified | | 9 |
| | | 100 |

Typical commercial iso-octyl alcohol also may contain up to about 15% of $C_7$ and lower alcohols and up to about 15% of $C_9$ alcohols.

One typical iso-octyl alcohol mixture has been found to have the following characteristics:

Hydroxyl No. _____ 429
Carbonyl No. _____ 1
Saponification No. _____ 0.5
Acid No. _____ <0.001
A. S. T. M. distillation:
  5% _____ ° C.. 170.3
  50% _____ ° C.. 183.3
  95% _____ ° C.. 188.3
  Final _____ ° C.. 202.7
  (Recovery 99.0%.)

$$\text{Alcohol purity} \left( \frac{\text{Hydroxyl No.}}{\text{Theor. Hydroxyl No. (431)}} \times 100 \right) = 99.5\%$$

and kinematic viscosity, at 68° F., 12.4–12.8 centistokes. In general, it is desirable that the kinematic viscosity of the alcohol be between about 12.0 and 13.0 centistokes at 68° F.

Other synthetic branched chain alcohols, especially those in the $C_7$ to $C_9$ range such as 2-ethyl hexanol can also be employed in the esterification reaction.

These esters and particularly the phthalic acid esters can be prepared by any of the conventional methods, as by reacting the alcohol with acid, or with acid anhydride, or by first transforming the alcohol into an alkyl halide and then reacting the latter with a metal salt of the selected acid. For example, phthalate esters may be prepared efficiently by reacting about 2 mols of a suitable alcohol with one mol of phthalic anhydride, without any catalyst or in the presence of sulfuric or preferably toluene sulfonic acid catalyst and using a solvent such as benzene as entrainer.

Since phthalic acid, phthalic anhydride and similar derivatives may be interchangeably employed in the above-indicated reaction to achieve the same result in a similar manner, it is to be understood that the term "phthalic acid" or other organic acid also includes the anhydride, e. g. phthalic anhydride and the other similar derivatives. In a similar manner the term "alcohol" is to be understood to include other alcohol derivatives which can be employed in the esterification reaction to produce the identical esters.

The esterification reaction is carried to substantial completion by esterification for a sufficient time. The unreacted alcohol is then stripped off from the ester product preferably under reduced pressure and blended with fresh alcohol for returning to the esterification zone.

The uncatalyzed phthalic acid esterification reaction is carried out at a reflux temperature of initially about 180° C., with a final reflux temperature of about 220° C. and higher. The catalytic esterification reaction is carried out at a reflux temperature of about 110° C. It can thus be seen that the esterification reaction is carried out in the conventional manner except for the incorporation of the diphenylol propane in the reaction mixture. The iso-octyl phthalate ester itself boils at about 200–220° C., at 2 mm. of mercury pressure. The reaction is carried out in corrosion resistant equipment such as glass-lined equipment.

It is desirable first to subject crude Oxo alcohol to a distillation at pot temperatures preferably not exceeding about 220° C., and preferably with previous caustic treatment, to remove some impurities such as aldehydes, acids, esters, acetals, unsaturated carbonyl compounds, etc.

In general, the preferred amount of diphenylol propane added to the esterification mixture is in the range of 0.04 to 0.4 weight percent, based on the alcohol. The diphenylol propane is desirably first dissolved in the alcohol employed. The use of this quantity of diphenylol propane results in an ester containing about 25–55% of this figure of diphenylol propane based, however, on the ester itself.

This invention is illustrated by the following examples:

EXAMPLE 1

The effect of adding diphenylol propane to the esterification mixture of phthalic anhydride and an iso-octyl alcohol prepared by the Oxo process was determined.

Two esterification reactions of identically similar reactants were carried out in the same manner as detailed above, but 0.2 weight percent, based on the alcohol, of diphenylol propane was added only to the second of the reaction systems. 100 cc. of the resultant ester of each reaction system was exposed to 125 p. s. i., of oxygen pressure for twenty-four hours at 100° C.

*Stability in an accelerated storage test— di-iso-octyl phthalate*

| Sample No. | 1 | 2 |
|---|---|---|
| Stabilizer | None | 0.2% diphenylol propane, based on alcohol. |
| Peroxide Content Before Testing, p. p. m | 14 | 14. |
| Peroxide Content After Testing, p. p. m. | 144 | 14. |

It should be noted that the ester sample which had been prepared in the absence of diphenylol propane exhibited a greater than 10-fold peroxide number increase, whereas the ester prepared in the presence of diphenylol propane exhibited no peroxide number increase. This proves that the diphenylol propane was carried through to the ester phase during the reaction and then acted as a stabilizer for the ester itself.

EXAMPLE 2

The stabilizing effect of diphenylol propane on various other organic esters was determined. Two identical 100 cc. samples of each ester indicated below were taken. The first item, A, indicates the peroxide numbers before aging of the first samples containing no inhibitor. The second item, B, indicates the peroxide numbers of the same samples containing no inhibitor after aging for 24 hours at 100° C., and 125 p. s. i. oxygen pressure. The third item indicates the peroxide numbers after similar aging of the second samples which however had had 0.25 weight percent diphenylol propane admixed.

trol ester after esterification. The results are tabulated in the table below.

Tensile properties were determined in the usual manner on a Scott Tester (Model L-5) at about 75° F., and 50% relative humidity, the rate of jaw separation being 20 inches per minute.

| | 1 | 2 | 3 | 4 | 5 | 6 | 7 |
|---|---|---|---|---|---|---|---|
| Stabilizer | DIOP Control None. | DIOP-1 pt. 2,6-ditertiary Butyl 4-methyl phenol added to control Ester After Preparation. | DIOP-1 pt. 2,6-ditertiary Butyl 4-methyl phenol added to Alcohol. Esterstripped of unreacted material. | DIOP-1 pt. 2,6-ditertiary Butyl 4-methyl phenol added to Alcohol. Ester Distilled off. | DIOP-0.25 pt. Diphenylol Propane added to control Ester After Preparation. | DIOP-1 pt. Diphenylol Propane added to Alcohol. Ester Distilled off. | DIOP-1 pt. Phenyl beta naphthylamine added to Alcohol. Ester distilled off. |
| Per Cent Light Transmission of Ester. | 87 | 72 | 79 | 80 | | 78 | 38. |
| ORIGINAL TENSILES—VINYL BLENDS | | | | | | | |
| Tensile-Elong | 3,125-285 | 3,265-285 | 3,055-275 | 2,920-280 | 3,095-305 | 2,945-295 | 3,145-300. |
| Mod. 100% | 2,045 | 2,285 | 2,000 | 1,935 | 1,825 | 1,920 | 2,045. |
| OVEN AGED TENSILES, 5 DAYS AT 100° C. | | | | | | | |
| Tensile-Elong | 2,375-110 | 3,165-255 | 2,385-130 | 2,400-110 | 3,000-240 | 3,125-265 | 3,025-225. |
| Mod. 100% | 2,340 | 2,525 | 2,300 | 2,365 | 2,310 | 2,450 | 2,535. |
| Per Cent Tens.-Elong. Retained. | 76-39 | 97-90 | 78-47 | 82-39 | 97-79 | 106-90 | 96-75. |
| OVEN AGED TENSILES, 7 DAYS AT 100° C. | | | | | | | |
| Tensile-Elong | 1,265-25 | 3,015-235 | 1,115-30 | 1,915-65 | 3,070-205 | 3,065-225 | 3,055-215. |
| Mod. 100% | | 2,580 | | | 2,590 | 2,585 | 2,665. |
| Per Cent Tens.-Elong. Retained. | 41-9 | 92-83 | 37-11 | 66-23 | 99-67 | 104-76 | 97-72. |

The results are indicated below:

| Ester | Item | Peroxide Number p. p. m. |
|---|---|---|
| 1. Diisooctyl adipate | A | 7.4 |
| | B | 607 |
| | C | 2.8 |
| 2. Diisooctyl sebecate | A | 6.4 |
| | B | 278 |
| | C | 3.6 |
| 3. Isotridecyl laurate | A | 4.4 |
| | B | 38.6 |
| | C | 8.6 |
| 4. Isotridecyl isotridecanoate | A | 2 |
| | B | 36.4 |
| | C | 12.5 |

These results indicate that the esters containing diphenylol propane had peroxide numbers after aging of about 1/3 to 1/300 that of the controls.

EXAMPLE 3

The capacity of diphenylol propane to be carried through unaffected to the ester phase and thus contribute to the ultimate stability of ester plasticized resins was compared for this characteristic with other well known stabilizers.

A 1% concentration of 2,6-ditertiary butyl 4-methyl phenol, phenyl beta naphthylamine and diphenylol propane were individually dissolved into equal quantities of the same iso-octyl alcohol. Each alcohol was then esterified with phthalic anhydride and the resulting ester distilled off, or in some cases the unreacted material was stripped from the ester. From the resulting esters a corresponding number of diisooctyl phthalate (diop) vinyl resin films were prepared and subjected to accelerated heat aging conditions indicated specifically in the table below, in order to determine the extent of inhibition if any. In preparing the test vinyl blend samples, 100 gms. of polyvinyl chloride resin were dry-blended by hand with 1 gm. of lead stearate, 50 gms. of plasticizer and 2 gms. of sodium organo phosphate (Vanstay 16). As a further test control, samples were prepared by adding appropriate amounts of 2,6-ditertiary butyl 4-methyl phenol and diphenylol propane to individual samples of the same uninhibited con- Several results are apparent.

The blends containing 2,6-ditertiary butyl 4 methyl phenol are stabilized only when that stabilizer was added to the ester after esterification. This is indicated by the fact that the percentage elongations retained in the samples wherein the stabilizer was added only during the course of the reaction, were little better than the results for the uninhibited control. This indicates quite clearly that the 2,6-ditertiary butyl 4-methyl phenol is adversely affected during the esterification reaction.

The phenyl beta naphthylamine, while it did stabilize the vinyl blend somewhat when added during the esterification reaction, also very badly discolored the ester and ester-vinyl films prepared therefrom. This is indicated by the percent light transmission of ester figures in the table.

On the other hand, the ester prepared according to the method of this invention, i. e., by the addition of diphenylol propane during esterification reaction, provided excellent heat stabilization and color stability.

Thus it can be seen that diphenylol propane is unique inasmuch as it alone gave good ester color and prevented deterioration of the ester-vinyl resin blend, as well as affording protection of the blend against discoloration during aging.

The diphenylol propane can also be added directly to the phthalate ester and other organic esters without introducing it during the course of the reaction. When employed in this manner, the diphenylol propane is added in an amount of from 0.02 to 0.25 weight percent, based on the ester. Amounts in excess of this causes opaqueness in the vinyl resin film. It is preferable, however, to incorporate the diphenylol propane directly during the esterification reaction, as this yields a colorless ester as well as a stable one, which is adapted for use as a plasticizer.

The diphenylol propane can also be added to liquid esters or polyesters to obtain improved stabilized lubricating and hydraulic fluids.

The process of this invention is also applicable to the esterification of other C7–C9 branched alcohols such as 2-ethyl hexanol and yield similar but not as marked advantages. Other bisphenols may be employed but they usually give somewhat inferior results. In a similar manner alkylated bisphenols of the type utilized in this invention may also be employed. Usable bisphenols having a substituent on the phenol ring are illustrated by 2,2 - bis (4 - hydroxy - 5-methyl phenyl) propane, 2,2-bis (4-hydroxy-5-isopropyl phenyl) propane.

It will be understood further that the foregoing examples have been given merely for purposes of illustration, but that other modifications of the present invention are possible without departing from the scope of the appended claims.

What is claimed is:

1. In a process for the preparation of an organic ester from an organic carboxylic acid and a branched saturated aliphatic monohydric unsubstituted alcohol the improvement which comprises adding to the esterification mixture a minor proportion of a bisphenol compound having the formula

wherein $R_1$ is an alkyl radical of 1 to 4 carbon atoms and wherein $R_2$ and $R_3$ are parahydroxyphenyl groups, in an amount sufficient to stabilize said ester against deteriorative changes.

2. In a process as in claim 1 wherein the alcohol is an Oxo alcohol.

3. In a process for the preparation of an organic ester from an organic carboxylic acid and a branched saturated aliphatic monohydric unsubstituted alcohol, the improvement which comprises carrying out the esterification in the presence of a minor proportion of diphenylol propane, said diphenylol propane being present in an amount sufficient to stabilize said ester against deteriorative changes.

4. In a process for the preparation of organic esters from phthalic acid and a branched $C_8$ saturated aliphatic monohydric unsubstituted alcohol, said ester being normally subject to deteriorative changes, the improvement which comprises adding to the esterification mixture a minor proportion of diphenylol propane in an amount sufficient to prevent said ester deterioration.

5. In a process for the preparation of organic esters from phthalic acid and a branched saturated aliphatic monohydric unsubstituted Oxo alcohol, said ester being normally subject to deteriorative changes, the improvement which comprises carrying out the esterification in the presence of a minor proportion of diphenylol propane in an amount effective to prevent said ester deterioration.

6. A process as in claim 5 in which the Oxo alcohol is in the $C_7$ to $C_9$ range.

7. A process as in claim 6 in which the Oxo alcohol employed comprises essentially as the major constituents 4,5-dimethyl hexanol, 3,5-dimethyl hexanol, 3,4-dimethyl hexanol, 3-methyl heptanol, and 5-methyl heptanol.

8. A process as in claim 7 in which the diphenylol propane is present in an amount of from 0.04 to 0.4 weight per cent based on the alcohol.

9. In a process for the preparation of an organic ester from phthalic acid and 2-ethyl hexanol, the improvement which comprises carrying out the esterification in the presence of a minor proportion of diphenlol propane, said diphenylol propane being present in an amount sufficient to stabilize said ester against deteriorative changes.

10. A composition of matter comprising a saturated aliphatic monohydric unsubstituted branched alcohol synthetic ester of an organic carboxylic acid said ester being normally subject to deteriorative changes, and a minor amount sufficient to prevent said deteriorative changes of a bisphenol compound having the formula

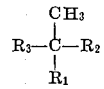

wherein $R_1$ is an alkyl radical of 1 to 4 carbon atoms and wherein $R_2$ and $R_3$ are parahydroxyphenyl groups.

11. A composition of matter comprising a branched saturated aliphatic monohydric unsubstituted alcohol synthetic ester of an organic carboxylic acid, said ester being normally subject to deteriorative changes, and a minor amount sufficient to prevent said deteriorative changes of diphenylol propane.

12. A composition of matter comprising a branched octyl phthalate normally subject to deteriorative changes and a minor amount sufficient to prevent said deteriorative changes of diphenylol propane.

13. A composition as in claim 12 in which the diphenylol propane is present in an amount of from 0.02 to 0.25 weight per cent based on the ester.

14. A composition of matter comprising a branched saturated aliphatic monohydric unsubstituted Oxo alcohol synthetic ester of phthalic acid, said ester being normally subject to deteriorative changes, and a minor amount sufficient to prevent said deteriorative changes of diphenylol propane.

15. A composition as in claim 14 in which the Oxo alcohol is in the $C_7$ to $C_9$ range.

16. A composition as in claim 15 in which the Oxo alcohol comprises essentially as the major constituents 4,5-dimethyl hexanol, 3,5-dimethyl hexanol, 4-ethyl hexanol, 3,4,4-trimethyl pentanol, 5,5-dimethyl hexanol.

WILBUR F. FISCHER.
FREDERICK KNOTH, Jr.
RAYMOND G. NEWBERG.

REFERENCES CITED

The following references are of record in the file of this patent:

UNITED STATES PATENTS

| Number | Name | Date |
|---|---|---|
| 2,434,662 | Latham et al. | Jan. 20, 1948 |
| 2,455,254 | Jarowski et al. | Nov. 30, 1948 |
| 2,515,906 | Stevens et al. | July 18, 1950 |